United States Patent
Sowada et al.

(10) Patent No.: US 7,884,703 B2
(45) Date of Patent: Feb. 8, 2011

(54) PILLOW SPEAKER REMOTE CONTROL

(75) Inventors: Mark Sowada, Montrose, MN (US);
John Heinsch, Watertown, MN (US);
Tonia Karbowski, Buffalo, MN (US)

(73) Assignee: Crest Electronics, Inc., Dassel, MI (US)

( * ) Notice: Subject to any disclaimer, the term of this patent is extended or adjusted under 35 U.S.C. 154(b) by 1374 days.

(21) Appl. No.: 11/358,599

(22) Filed: Feb. 21, 2006

(65) Prior Publication Data

US 2006/0217987 A1   Sep. 28, 2006

Related U.S. Application Data

(60) Provisional application No. 60/664,676, filed on Mar. 23, 2005.

(51) Int. Cl.
G08B 5/22 (2006.01)
G08C 19/00 (2006.01)
H04B 1/20 (2006.01)
H04N 5/44 (2006.01)

(52) U.S. Cl. .............................. 340/286.07; 340/825.25; 340/825.69; 340/825.72; 348/734

(58) Field of Classification Search .................. 381/14, 381/58, 59, 77, 332, 333, 388, 32, 124; 348/734; 704/275; 340/286.07, 825.25, 825.57, 825.69, 340/825.72; 455/66.1; 341/176; 398/106–112
See application file for complete search history.

(56) References Cited

U.S. PATENT DOCUMENTS

| | | | | |
|---|---|---|---|---|
| 5,495,301 | A | * | 2/1996 | Mudra ........................ 348/734 |
| 5,650,831 | A | | 7/1997 | Farwell ...................... 348/734 |
| 2002/0044226 | A1 | | 4/2002 | Risi ........................... 348/734 |
| 2003/0169234 | A1 | | 9/2003 | Kempisty .................... 345/158 |
| 2004/0065731 | A1 | | 4/2004 | Vesterling ................... 235/382 |

FOREIGN PATENT DOCUMENTS

| | | |
|---|---|---|
| EP | 1 017 032 | 7/2000 |
| WO | WO 03/021945 | 3/2003 |

OTHER PUBLICATIONS

Written Opinion.
International Search Report.

* cited by examiner

*Primary Examiner*—Vivian Chin
*Assistant Examiner*—George Monikang
(74) *Attorney, Agent, or Firm*—Westman, Champlin & Kelly PA

(57) ABSTRACT

Embodiments of a pillow speaker are disclosed. In one embodiment, a pillow speaker includes a case that contains a collection of control circuitry. A wireless transmitter is operably connected to the collection of control circuitry. The wireless transmitter is configured to transmit control signals. Also included is a wired interface having at least two elongated conductors connected to the collection of control circuitry.

20 Claims, 4 Drawing Sheets

PILLOW SPEAKER REMOTE CONTROL

The present application is based on, and claims the benefit of, U.S. provisional patent application Ser. No. 60/664,676, filed Mar. 23, 2005, the content of which is hereby incorporated by reference in its entirety.

BACKGROUND OF THE INVENTION

The present invention generally pertains to pillow speaker devices. More specifically, the present invention pertains to pillow speaker devices that incorporate multiple interfaces through which control signals may be communicated.

In healthcare institutions, use of pillow speakers has become quite prevalent. Unfortunately for facilities that rely on pillow speakers, a specialized healthcare television is necessary to support pillow speaker implementation. Healthcare televisions currently on the market are generally available only at a higher cost than that associated with off-the-shelf televisions purchased from the average electronics retail store.

Currently, there are at least four major brands of healthcare grade televisions in the industry (RCA, Zenith, Phillips and PDI). These televisions are typically designed to interface through one or more wires with a pillow speaker. Audio information is passed through the wired connection for broadcast over the pillow speaker.

In most cases, a pillow speaker is also configured such that at least some user-initiated control signals may be passed, through the wired connection, from the pillow speaker to the television. In this manner, a user can effectuate certain control preferences (e.g., a changing of the currently displayed channel, turning the television on or off, activating or deactivating closed captioning, etc.). In some cases, certain control signals may be directly acted upon by circuitry contained within the pillow speaker itself (e.g., a change in the current level of volume leads to a direct adjustment of the broadcast from the pillow speaker). Other user-initiated control signals may be transferred, through the wired connection, to some other device or system (e.g., a user might activate a room light or a nurse call system by pressing certain buttons associated with the pillow speaker).

It is not uncommon for wiring inconsistencies to be encountered from one facility to the next. Wiring differences can pose challenges in terms of interfacing with pillow speakers. For a given facility with a relatively unique wiring scheme, pillow speakers may have to be specially customized (e.g., customized with different wiring and/or jumpering internally to adjust to accommodate "in-wall" wiring issues).

It is also worth noting that the four most common brands of healthcare televisions all operate on different power levels. This also poses challenges in terms of interfacing with pillow speakers. In some instances, changes must be made internally within a pillow speaker to accommodate certain power level requirements. If a given facility happens to have more than one brand of healthcare television, they either must stock two different pillow speakers or have the capacity to manually reconfigure pillow speakers (e.g., move jumpers and/or flip-flop a power connector to ensure correct operation with a given television).

It is also worth mentioning that, for many facilities, it is becoming increasingly common to supply rooms with remote controls that are separate from the pillow speaker. For example, many rooms may be supplied with a VCR or DVD player (or a combo unit) that is separate from the television. For each device separate from the television, a separate remote control may be provided. In these cases, the user is expected to keep track of, and know how to operate, the additional remote controls.

It comes without surprise that it is common for non-wired remote controls to become damaged, lost or destroyed. Some accounts are that maintenance workers in some facilities replace between five and twenty remotes per month. The fate of a replaced remote varies but circumstances include being accidentally thrown in the garbage, being wrapped up with sheets and sent to laundry, or being accidentally or intentionally carried off.

SUMMARY

Embodiments of a pillow speaker are disclosed. In one embodiment, a pillow speaker includes a case that contains a collection of control circuitry. A wireless transmitter is operably connected to the collection of control circuitry. The wireless transmitter is configured to transmit control signals. Also included is a wired interface having at least two elongated conductors connected to the collection of control circuitry.

DESCRIPTION

Figure 1:
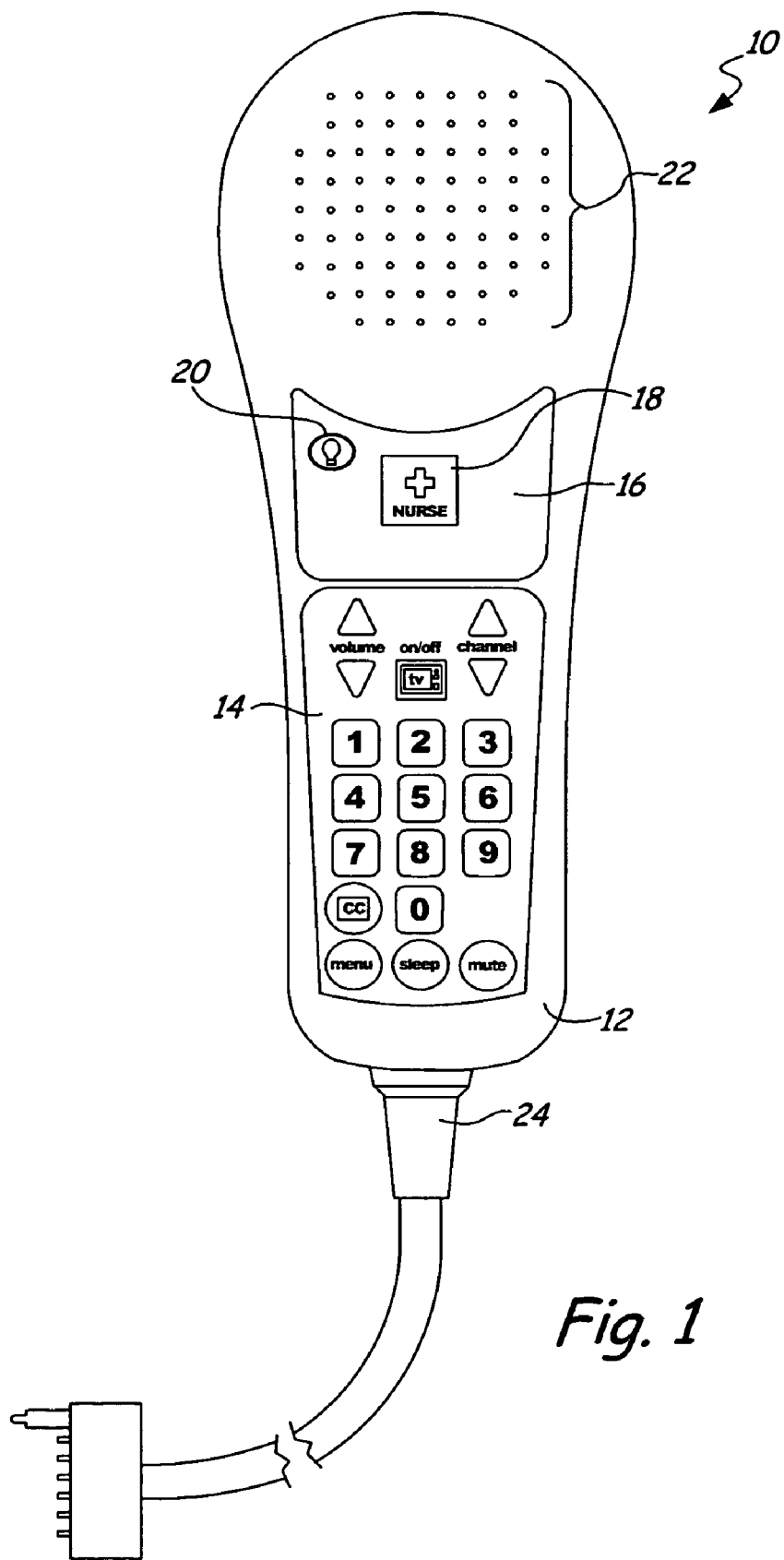
FIG. 1 is a top view of a pillow speaker device.

FIG. 1 is a top view of a pillow speaker device 10. As shown, pillow speaker device 10 includes an outer case 12. Positioned on a surface of outer case 12 is a control panel 16. Control panel 16 includes two membrane buttons in the form of a nurse call button 18 and a light control button 20 (of course, panel 16 could be configured with any number of membrane buttons, for example, up to five or more). A plurality of holes 22 are formed within case 12 to support the broadcast of audio signals from a speaker contained within the device.

Also positioned on a surface of outer case 12 is a control panel 14 that includes a wide variety of membrane buttons that are generally designed to support user control of an entertainment device such as, but not limited to, a television device, a VCR device, a DVD device, etc. It should be noted that button configurations other than the specifically illustrated configuration are within the scope of the present invention (e.g., any buttons associated with typical entertainment remotes, including universal remotes, could be included). Buttons are provided to enable a user to adjust volume, adjust the currently displayed channel, turn the television on or off, enter numbers, activate or deactivate closed captioning, activate or deactivate a menu, activate or deactivate a sleep mode functionality, and to activate or deactivate a volume mute functionality. As with traditional television remote controls, some buttons may have different functionality depending on an operational context. For example, the channel and/or volume adjustment buttons may also support navigation through one or more displayed menus.

A hard-wire connection 24 is shown entering into the bottom of outer case 12. In one embodiment, as those skilled in the art will appreciate, hard-wire connection 24 includes at least two elongated conductors (e.g., elongated wires). In one embodiment, this is the connection through which audio is transferred to the speaker that broadcasts out holes 22. In another embodiment, information related to buttons 18 and 20 is also transferred through connection 24 in order to support related functionality. The hard-wire connection 24 may include multiple sets of elongated conductors.

Figure 2:
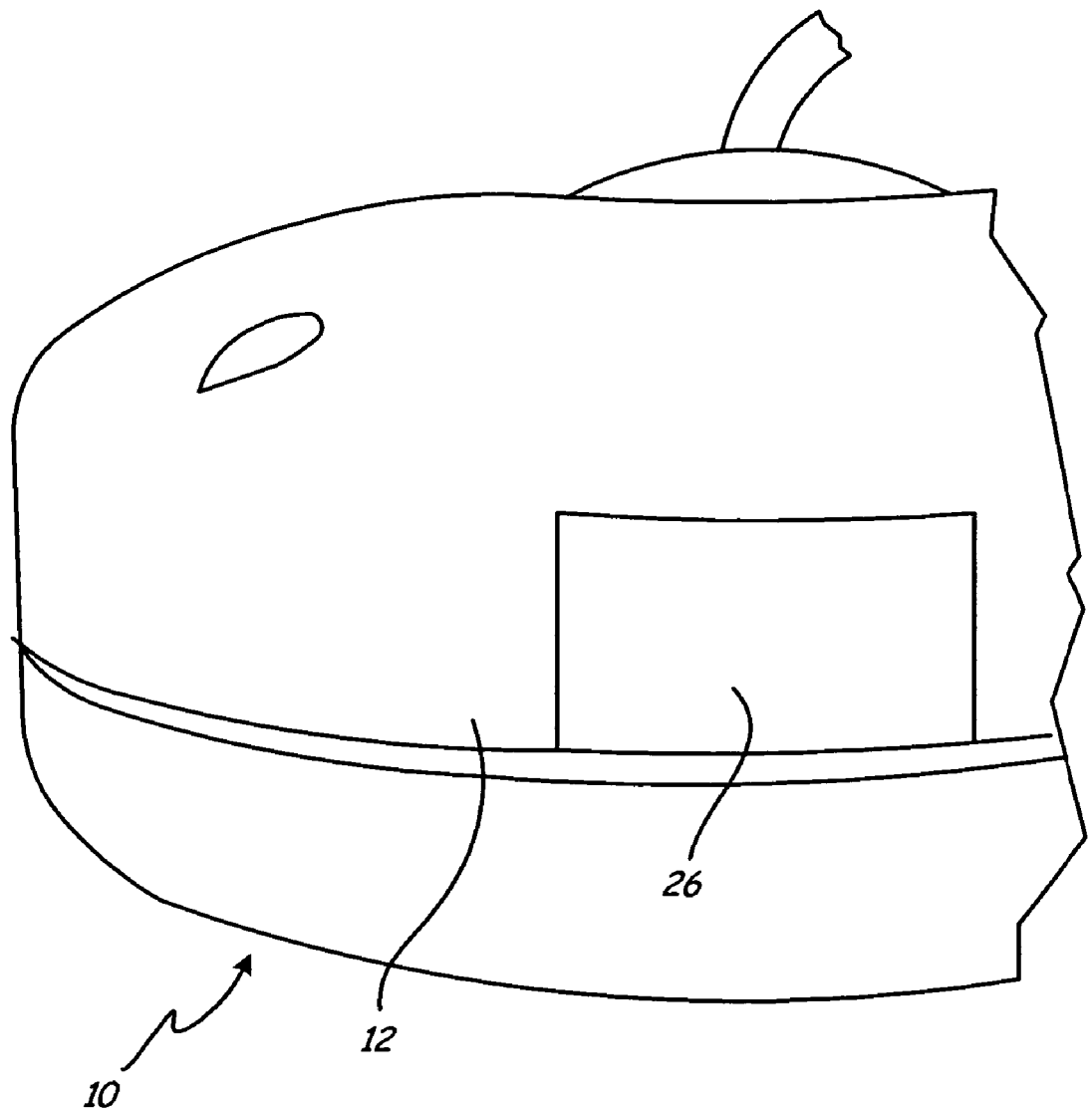
FIG. 2 is an oversized, partial end perspective view of the pillow speaker device.

FIG. 2 is an oversized, partial end perspective view of pillow speaker 10. This view clearly shows an integrated infrared interface 26. In one embodiment, interface 26 includes a panel that covers an LED that is exposed through an opening in case 12. In one embodiment, interface 26 is configured to direct a light (radiation) signal toward a television or other electronic to be controlled. In one embodiment, information related to inputs that correspond to the buttons on panel 14 is communicated through mechanism 26 instead of through wired connection 24.

Figure 3:
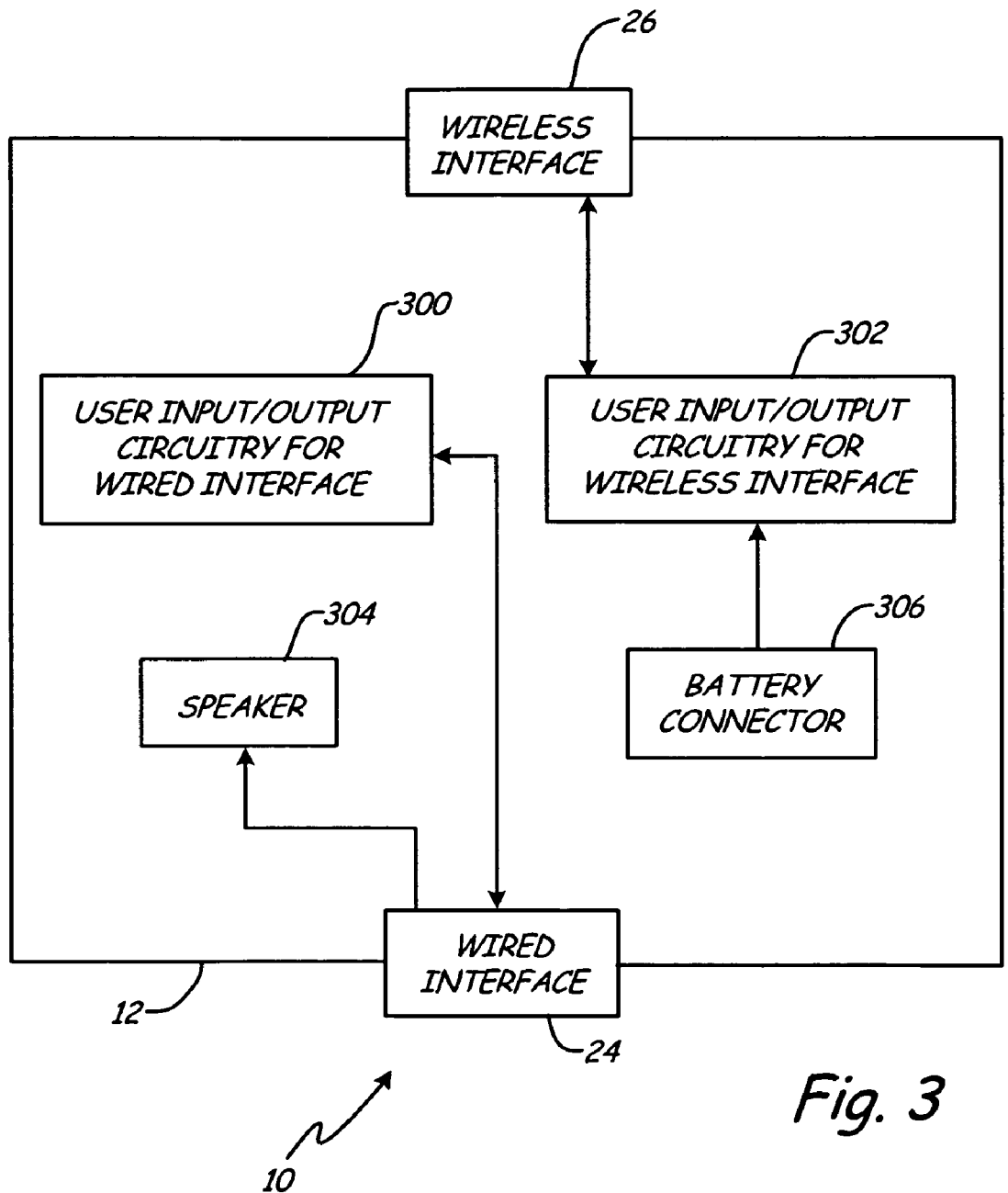
FIG. 3 is a schematic block diagram of the internal components of the pillow speaker device.

FIG. 3 is a schematic block diagram of the internal components of device 10. The buttons associated with control panel 16 are illustratively functionally connected to circuitry 300. Circuitry 300 is configured to communicate as necessary through interface 24 in order to execute user commands received through the buttons associated with control panel 16.

The buttons associated with control panel 14 are illustratively functionally connected to circuitry 302. Circuitry 302 is configured to communicate as necessary through interface 26 in order to execute user commands received through the buttons associated with control panel 16.

A speaker 304 is configured to receive and broadcast audio information received through wired interface 24 (broadcast is illustratively directed through holes 22 formed in case 12). In another embodiment (not illustrated), speaker 304 is configured to broadcast audio information received through a radio receiving interface (not illustrated). In one embodiment, the audio broadcast by speaker 304 is an audio signal associated with a television broadcast.

A battery connector 306 is provided in order to support battery power for circuitry 302 and/or communications of information through wireless interface 26. It should be noted that the battery could just as easily be configured to power any of the components within device 10. It should also be noted that any or all of the components could just as easily be alternatively powered by a direct wired power connection associated with interface 24. In one embodiment, a portion of case 12 (e.g., the back) includes a panel that can be removed and replaced as necessary to insert or replace batteries within battery connector 306.

Those skilled in the art will appreciate that, in the context of FIG. 3, the illustrated connections between components within case 12 are exemplary only and are probably over simplified. For example, FIG. 3 shows speaker 304 as being directly connected to wired interface 24. In actuality, the connection might actually be through circuitry 300 and/or circuitry 302. Further, a one-headed arrow should not be interpreted as prohibiting two-way communication. Components can be configured to receive and/or transmit information as necessary to support a set of particular system requirements.

In one embodiment, circuitry 302 includes electronic means to control the transmit power of the wireless transmitter (e.g., an IR diode associated with interface 26) to prevent problems if there are two of the same devices in a room. In one embodiment, a potentiometer is implemented to enable selective adjustment of IR power (e.g., potentiometer might be externally accessible for user adjustment, accessible within battery compartment, or only accessible by opening up internal components). This enables multiple devices to operate on the same code within the same room or area. An alternate approach within the scope of the present invention is to implement a separate limiting device that is added to the pillow speaker to block some output (e.g., some of the diode output).

In one embodiment, circuitry 302 includes all of the necessary circuits that are presently available in existing remote controls used with televisions and the like. In one embodiment, an LED associated with interface 26 is connected through a suitable line to the circuits associated with circuitry 302. These circuits are then configured to provide the necessary signals to the LED in response to suitable control buttons on the front side of the pillow speaker case.

In general, lighting functionality and/or an incorporated nurse call function will remain hardwired, as presently is done, but the controls for televisions, VCR's, DVD players and the like will leverage the described wireless remote control functionality. In one embodiment, the circuitry that supports the wireless remote control functions are configured to be programmable. Thus, multiple brands of VCR's and DVD's, for example, can be controlled by providing inputs to controls on the pillow speaker upon proper programming.

It should be noted that any pillow-speaker-initiated, wireless control of any electronic device is within the scope of the present invention. The obvious candidates are audio or video devices such as, but not limited to, TV's, DVD players, CD players, VCR's, cable boxes, etc. Other devices fall outside of typical audio or video devices. For example, devices such as switch boxes, lighting control, environmental control, temperature control, curtain control and the like could just as easily be controlled in a similar manner.

In one embodiment, the wireless circuitry is programmable in a manner similar to a tradition television remote control. For example, the circuitry can be configured such that pressing a certain sequence of keys will initiate a programming mode. Then, entry of certain key sequences will enable different certain control modes. In one embodiment, wireless interface 26 is also configured to receive signals (e.g., infrared signals) such that information can be transferred through the interface to the wireless circuitry in order to support programming functionality. In another embodiment, programming is accomplished by transmitting, by radio waves, information to a radio receiver associated with the wireless circuitry (e.g., a radio signal is communicated to a radio receiver in order to facilitate the programming of the circuitry).

Figure 4:
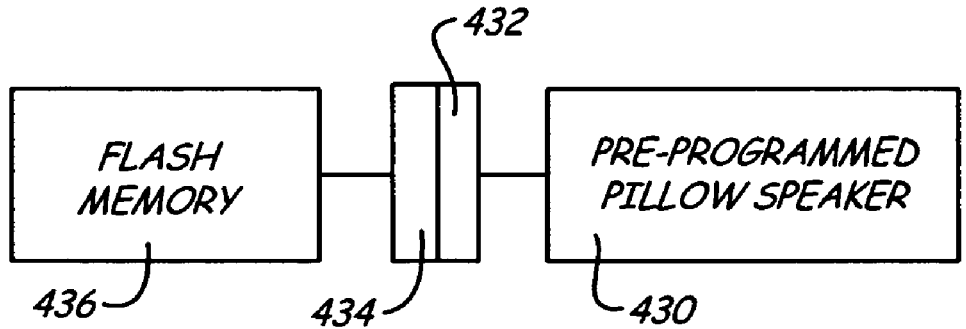
FIGS. 4 and 5 are schematic illustrations of systems that incorporate programmable pillow speakers.
Figure 5:
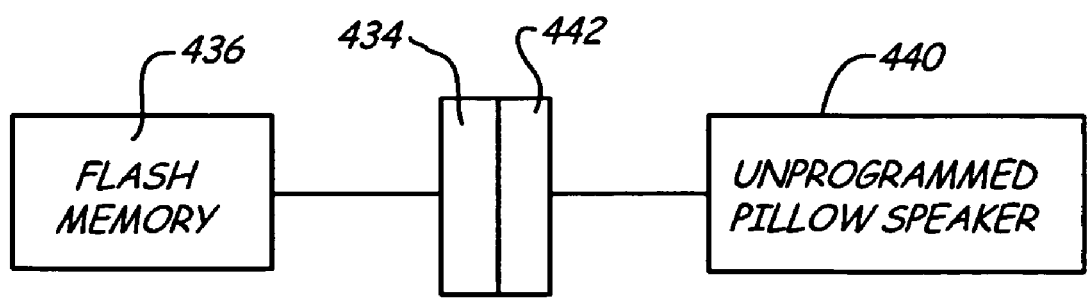

There are still other ways in which programming can be accomplished. FIGS. 4 and 5 are schematic illustrations of systems that incorporate programmable pillow speakers. Referring to FIG. 4, a pillow speaker that incorporates a wireless interface (e.g., LED programming controls) and has been pre-programmed is represented by the block 430. A connector 432 from the pre-programmed pillow speaker is connected to a second corresponding connector 434. Connector 434 is associated with a flash memory or other suitable memory device 436. Program signals can be transmitted from device 430 to the memory 436. Then, the memory 436, now shown in FIG. 5, and its connector 434, can be connected to another unprogrammed pillow speaker represented by block 440. This latter connection occurs through a connector 442. In this manner, the unprogrammed pillow speaker can be provided with programming signals similar to those associated with device 430.

In one embodiment, a hand held "cloning module" that receives and reads, and also transmits signals (e.g., infrared signals) can be used to program pillow speakers that are used for electronic device controls, such as for television, DVD players, VCR's, etc. The cloning module can be provided with desirable code directly from a source audio or video device, or it can obtain the desirable code from a properly coded remote control, or it can obtain the desirable code from a properly coded pillow speaker such as that represented at 430 in FIGS. 4 and 5. The cloning module then can be used to program other pillow speakers.

In one embodiment, a cloning module is configured with a capability to store on-board code tables of audio or visual devices. The storage capability is illustratively updatable to accommodate new devices as they are released or desired. The cloning module is illustratively configured to generate sequential, Device On/Off codes until the desired device responds appropriately (e.g., the cloning device interacts with an audio or visual device via an infrared or other wireless interface). Once the correct On/Off code is determined, the cloning module will use that code to search the code set tables it has stored in memory for a match, at which point the full code table can be accessed for controlling any supported function on the device.

Once the appropriate code has been established for a particular device, an operator can illustratively save that code information for later retrieval. In one embodiment, the "search and store" function can be done for several devices (TV's, VCR's, DVD players, etc.).

In one embodiment, the cloning module is also configured to read an output from any IR remote control unit, including but not limited to a pre-programmed pillow speaker with an IR interface. The cloning module can read such an output and store the learned code in memory. An On/Off code is illustratively utilized as the code key identifier, which the cloning module uses to search on and establish a match to a code set within its stored memory. Once appropriate code has been established for a particular device, an operator can then save that information for later retrieval.

In one embodiment, once the cloning module contains desirable information, that information can be transferred to a pillow speaker device as desired. Of course, this requires a communication connection between the cloning device and appropriate circuitry within the pillow speaker device itself. The communication connection might be physical (e.g., USB, serial, etc.) or remote (IR, radio, etc.). The cloning module is illustratively configured to enable an operator to select (e.g., via a user interface on the cloning module) any code set stored in memory, and, through the communication connection, upload data to a connected pillow speaker device. Thus, field programming and re-programming is simplified.

Thus, the cloning device is capable of generating an appropriate signal to be utilized to control an audio video device; or to receive a signal from a remote control device used to control an audio or visual device; or to upload or download digital data from or to an existing pillow speaker.

Thus, an appropriately programmed pillow speaker with an IR interface is illustratively capable of controlling most IR-controlled audio and video devices. In one embodiment, the pillow speaker device is equipped with expanded memory and a user interface that allows a user or operator to search and select an appropriate code set for a given device (e.g., without use of an external closing module, etc.).

The present description will now transition to outlining illustrative functional characteristics and technical options associated with a pillow speaker such as that shown in FIGS. 1-3. It should be noted that the characteristics and technical options provided below are provided for purpose of setting forth a complete example. In no way is the present invention limited to any of the characteristics or options listed below. For the purpose of illustration, the assumption will be that the wireless interface is an infrared interface. It should be understood, however, that the present invention is not limited to this particular type of interface. For the sake of efficiency, this material will be presented in outline form.

A. Illustrative Functional Characteristics

A1. The IR pillow speaker device can illustratively be configured to interface with nurse call systems such as those that include the following plug styles:
American Zettler (DB9)
Dukane (12 pin rect, 17 pin w/ ¼" phone, 17 pin w/o ¼" plug, 18 pin, 12 pin round)
Ektacom (8 pin octal, 15 pin Dsub)
Executone Comcare (7 pin+Center post conductor)
Executone Futura (7 pin+Center post conductor)
Fisher Berkly (8 pin octal, 14 pin, 15 pin Dsub)
Hill-Rom (8 pin octal, 14 pin, 15 pin Dsub, 37 pin)
Hill-Rom Composer (20 pin)
Intercall (7 pin, 8 pin DIN)
Jeron (8 pin DIN—new/8 pin DIN—old)
Rauland (8 pin DIN, 12 pin)
Sylvania/HCE—20 pin
Simplex (RJ45)
Tektone (RJ45, 8 pin DIN)
Wescom (RJ45)
Westcom (10 pin Modular)
American Zettler (6 pin)
Ektacom (14-pin)
In one embodiment, the wired connection associated with the pillow speaker device is configured to support interfacing with a nurse call system and/or to an entertainment system (e.g., a TV, a DVD device, a VCR device, etc.), either directly or via interconnect wiring. In one embodiment, this interfacing incorporates a connector connected to one end of the wired connection (the other end being connected to circuitry within the pillow speaker device).

A2. The IR pillow speaker can illustratively be configured to control any brand of TV (healthcare or non-healthcare). The control mechanism illustratively operates on battery power.

A3. The IR pillow speaker is illustratively configured to control at least multiple brands of VCR's and DVD players. As has been discussed herein; however, the scope of the present invention is not so limited.

A4. The IR pillow speaker is illustratively programmed at the factory with an initial code chosen for a TV, DVD and VCR player per a consumer request. These codes can be changed in the field, for example, by using a sequence of buttons to get into a programming mode and then selecting the brand of device wanted. Another way to re-program the units is illustratively to interface a programming device with a programming port situated within the battery compartment of the pillow speaker device. If the consumer has problems re-programming the unit, there may be an option to send the unit back to the factory for re-programming. Other programming options have been discussed herein and are, of course, within the realm of possibilities.

A5. The IR pillow speaker audio system is illustratively configured to operate as an audio output for the TV and intercom system as well as a microphone for the intercom system.

A6. The fundamental audio tone of the speaker/housing combination is illustratively 300 Hz or less.

A7. The interface to the TV/VCR/DVD/etc. (e.g., the entertainment membrane button panel) can include many different types of buttons. Following is a list of examples of button types. At least the radio button is illustratively optional based on consumer preferences. Some buttons may be standard. Buttons, not by limitation, could include any combination of:
Power on/off
Channel up/down
Volume up/down—at the television
Direct channel access (0-9 buttons)
Mute
FM radio (e.g., built into the TV)
Closed caption
TV (to operate the TV)
VCR (to operate the VCR)
DVD (to operate the DVD player)
Input
Enter (DVD/VCR functions)
Some buttons can be implemented as a second function to already used buttons. For example, second functions might include:
Directional buttons (for VCR and DVD functions)
Play
Stop
Pause
Fast Forward
Rewind
Scan Forward
Scan Reverse A8. The IR pillow speaker illustratively includes a nurse call button that interfaces with the systems identified in A1.

A9. The IR pillow speaker illustratively may include switches or buttons for lights, an external radio, or any other external device.

A10. The IR pillow speaker can illustratively be implemented to function with power from 2-AA batteries.

A11. The IR pillow speaker is illustratively configured to not lose the memory of codes when the batteries are being replaced.

A12. The IR pillow speaker battery area is illustratively accessible from the outside of the unit with screws holding down the battery cover to deter tampering. This also protect the programming port (e.g., a port configured to support interaction with a cloning device) and a potentiometer associated with the IR power output.

A13. The IR pillow speaker IR-LED is illustratively protected from contact with the ground when dropped. For example, a cover is illustratively placed over the LED.

A14. The IR pillow speaker is illustratively configured to operate a TV from, for example, up to a distance of 20 feet or more A15. A given IR pillow speaker is illustratively configured to function in a room with two TV's, without interfering with one TV while operating the other. This is accomplished through mechanically and/or electronically adjusted IR LED power levels (e.g., 50-100% power). If a consumer desires an IR pillow speaker to be used in a 2 TV room, an IR LED can be programmed to have less power, thereby reducing the potential for interference with another TV in the same vicinity.

A16. The IR pillow speaker case material is illustratively ABS, UL 94-V0 flame rated.

A17. The IR pillow speaker switches are illustratively rated for a minimum of 100 ma at 30VDC.

A18. The IR pillow speaker switches are illustratively configured to provide tactile and/or audible feedback to the user.

A19. The IR pillow speaker switches are illustratively color coded by function.

A20. Braille is illustratively included on at least the nurse call button.

A21. A headphone jack is illustratively an option. The jack may be implemented as an insert to the mold, where if it is not requested or desired by a consumer, then it is not included.

A22. The entertainment membrane buttons illustratively have a background that does not match the background of its associated panel background.

A23. A different icon color can be utilized for some functions (e.g., yellow for light buttons).

B. Accessories
B1. Audio adapter cable for non-Healthcare TV's.
B2. Cloning module and/or tester.

C. Models/Variants
C1. At least the following control combinations shall be available (of course, the scope of the present invention is not limited to any one particular combination):
   A. TV/VCR/DVD Controls (entertainment membrane switch panel, e.g. panel 14):
      1. Power
         Direct channel access (0-9 key)
         Channel up/down
         Digital Volume up/down
         Mute/Closed caption
         TV/VCR/DVD Selection
         Play/Stop/Fast Forward/Rewind/Pause—(VCR/DVD)
         Enter (VCR/DVD)
         Input
      2. Power
         Direct channel access (0-9 key)
         Channel up/down
         Digital Volume up/down
         Mute/Closed caption
         TV/VCR/DVD Selection
         Play/Stop/Fast Forward/Rewind/Pause—(VCR/DVD)
         Enter (VCR/DVD)
         Input
         Built in FM radio control
      3. Power
         Direct channel access (0-9 key)
         Channel up/down
         Digital Volume up/down
         Mute/Closed caption
         TV/VCR/DVD Selection
         Play/Stop/Fast Forward/Rewind/Pause—(VCR/DVD)
         Enter (VCR/DVD)
         Input
         Headphone Jack
      4. Power
         Direct channel access (0-9 key)
         Channel up/down
         Digital Volume up/down
         Mute/Closed caption
         TV/VCR/DVD Selection
         Play/Stop/Fast Forward/Rewind/Pause—(VCR/DVD)
         Enter (VCR/DVD)
         Input
         Built in FM radio control
         Headphone Jack B. LED Options for entertainment membrane switch panel (the panel can include any combination of output LED's . . . following is an example):
  3 LED's next to the TV/VCR/DVD buttons so that it is apparent which one is in use. In one embodiment, this is a momentary light that stays on for a short time to save battery life. If the TV, VCR or DVD buttons are pressed, the LED under each of these buttons will briefly light up (e.g., a one second flash). In one embodiment, buttons pressed thereafter while in a certain mode will send out two short flashes to the particular LED for the unit that it is functioning. In one embodiment, color of these LED's is green because it is perceived as one of the brightest LED's.
C. Nurse call control combinations (interface membrane switch panel, e.g., panel 16)
  1. Nurse call
  2. Nurse call
    1 light
  3. Nurse call
    2 lights
  4. Nurse call
    3 lights
  5. Nurse call
    4 lights
  6. Nurse call
    External radio
  7. Nurse call
    External radio
    1 light
  8. Nurse call
    External radio
    2 lights
  9. Blank
D. LED combinations for interface membrane switch panel (the panel can include any combination of output LED's . . . following are some simple examples):
  1. No LED's
  2. 1 green LED
  3. 1 red LED
  4. 1 green LED, 1 red LED
C2. Every control option, whether listed in C1 or not, is illustratively available with each of the connectors and control protocol for the systems listed in Section A.
C3. Every device combination is illustratively available with coding to support any television with a suitable interface.
D. Illustrative Listing of Components
D1. Overview of components that might be incorporated into a pillow speaker device as described:
  A front case portion (i.e., a two-part case)
    May incorporate holes for LED display
    May incorporate openings for button panels
    May incorporate opening for potentiometer
    (alternate volume control, control for IR output, etc.)
  A back case portion
    May have opening for headphone jack
    May incorporate mounting area for batteries and battery terminals
  A battery compartment cover
    May be configured to be screwed down
    May incorporate ergonomic ridges so that, when holding the pillow speaker, people can rest their fingers in the ridges for a more natural feel.
  A battery compartment gasket
    Positioned between back case and the battery cover
    May be designed to keep liquid from entering the unit through the back battery case.
  Cover, IR LED
    May be a small piece of IR transparent material . . . glued around the edges and then adhered to the back case
    May be shaped similar to back case in a curve
    Covers the LED and serves to protect it from contact (e.g., if the device is dropped)
    May be made out of dark material (not see-through)
  IR LED Assembly
    May include the IR LED, wires, heat shrink, pins, connector, etc.
    Could be a 5 mm diameter LED with a 40 degree viewing angle
    Could be clear in color and 8.6 mm in height
    Configured to be placed in grommet on back case
    Could include 2-pin connector plugged into appropriate circuit board to make LED functional
  Grommet, IR LED
    Holds the IR LED in place (formed in back case or placed in back case during sub-assembly)
    Friction force holds the LED
  Terminal, Positive, AA Battery, IR
  Terminal, Negative, AA Battery, IR
  Battery, Alkaline, AA
  Screws for connecting case portions, battery compartment, mounting circuit board(s), etc.
  PCB Assembly, Interface (e.g., circuit board for panel 16 functionality)
    May or may not be configured to support a potentiometer for controlling transmission power of wireless interface (e.g., IR power)
    May be 38.1 mm at the bottom and 44.45 at the top. Height may be 35.56. May be 1.57 mm thick
    May be made out of FR4-059
    May be mounted to front case with component side up (LED side down)
    May include multiple mounting holes
    May include LED's as appropriate
  PCB Assembly, Entertainment, IR (e.g., circuit board for panel 14 functionality)
    May be 38.1 mm by 38.1 mm
    May be 1.57 mm thick and made out of FR4-059
    May include multiple mounting holes
    May be mounted on the front case with component side up
    May include LED's as appropriate
  Cable Assembly
    May consist of the cable, gasket/strain relief, plug end, connectors and pins
    May include three connectors attached to the cable assembly
    Connector ends on the cable assembly may be split into 2 different sections
      The first section may have 2 connectors with a short wire length: a 2-pin connector and a 12-pin locking header. Headers illustratively connect to the entertainment board, so long wire sections not required (assumes that entertainment board is on bottom).
      The section may have longer wire and consist of one 20-pin locking header. These headers may connect to interface board, so they may have longer sections of wire (assuming interface board is on top).
  Security Clip
    For consumer use
  Membrane Switch Interface (e.g., panel 16)
    May be multiple color overlay
    May be made out of polyester film with a double coated adhesive backing Switches (i.e., buttons) may be stainless steel domes (to provide audible and tactile feedback)
Membrane switch ribbon may be employed
Membrane Switch Entertainment, IR (e.g., panel 14)
May be multi-colored
Overlay may be made out of 0.152 mm thick polyester film with a double coated adhesive backing
Switches (i.e., buttons) may be poly-domes to provide semi-audible and semi0tactile feedback
Membrane switch may be mounted to a PC board with a connector on it
a ribbon connector may attach to the connector on the board
Speaker Assy.
May be 66 mm in diameter
Speaker Sponge Back (e.g., for mounting speaker)
Speaker Sponge Front (e.g., for mounting speaker)
Headphone Jack Assembly (optional)

There are many potential advantages associated with the described introduction of a wireless interface into the standard pillow speaker design. For example, the new design enables facilities to purchase televisions that are not necessarily healthcare grade. Further, at least some of the challenges associated with in-wall wiring inconsistencies are eliminated or avoided. Further, the wireless interface can be leveraged to enable control of devices other than a television, thereby making it possible to eliminate the need for extra "loose" remote controls. A pillow speaker can easily be equipped with circuitry that enables a user to provide wireless control signals for controlling electronic devices such as, but not limited to, televisions, videocassette recorders, digital videodisc players, digital music players, digital video players and other similar devices. Still further, because the wireless interface makes it possible to avoid special wiring and/or power requirements, facilities avoid the hassles associated with re-configuring pillow speakers and/or stocking more than one kind of pillow speaker. The wireless interface is illustratively configurable to accommodate interaction with certain electronic devices (e.g., particular television codes can be selected such that a given pillow speaker can be easily adapted to control a particular television).

It is worth emphasizing that the described implementation of a wireless interface enables a broad range of advantages in terms of simplified configurability. Advantageous features include the simplified ability to control the power necessary for different types of electronic devices, and also a simplified way of programming a pillow speaker to operate certain device functions (e.g., certain television functions). It is even possible for programming characteristics to be transferred to an external memory, such as a flash memory, and then the memory utilized to reprogram multiple pillow speakers having the described wireless controls (e.g., infrared controls). This is a great time saver in that all of the televisions in a hospital, for example, would otherwise have to be individually programmed to accept any new installations.

Although the present invention has been described with reference to preferred embodiments, workers skilled in the art will recognize that changes may be made in form and detail without departing from the spirit and scope of the invention.

What is claimed is:

1. A pillow speaker, comprising: a case; a collection of control circuitry positioned within the case; a wireless transmitter operably connected to the collection of control circuitry, the wireless transmitter being configured to transmit wireless control signals to an external electronic media device, the wireless transmitter including an infrared interface that is integrated with the pillow speaker, the infrared interface having a light emitting diode and a panel, the light emitting diode being exposed through an opening in the case, the panel being attached to the case and covering the light emitting diode; and a wired interface that includes at least two elongated conductors connected to the collection of control circuitry, the wired interface being configured to receive an audio signal from the external electronic media device.

2. The pillow speaker of claim 1, wherein the elongated conductors are contained within an elongated cable, and wherein the infrared interface is configured to direct the wireless control signals towards the electronic media device that is to be controlled by the wireless transmitter.

3. The pillow speaker of claim 1, further comprising:
a battery connector provided to support battery power for the wireless transmitter; and
wherein a portion of the case includes another panel that is removable to attach batteries to the battery connector.

4. The pillow speaker of claim 1, wherein the wired interface further comprises a connector connected to the elongated conductors, wherein the connector is configured to interface with an entertainment system either directly or through interconnect wiring.

5. The pillow speaker of claim 1, wherein the wired interface further comprises a connector connected to the elongated conductors, and wherein the connector is configured to interface with a nurse call system.

6. The pillow speaker of claim 1, further comprising a speaker positioned within the case, the speaker being configured to operate as an audio output and as a microphone.

7. The pillow speaker of claim 6, wherein the wired interface is configured to facilitate a transfer of audio information to the speaker, and wherein a separate limiting device is added to the pillow speaker to block some output of the light emitting diode.

8. The pillow speaker of claim 1, further comprising an input button configured to facilitate receipt of a user command and transfer of a corresponding command through the wireless transmitter, the input button being operably connected to the collection of control circuitry.

9. The pillow speaker of claim 1, further comprising an input button configured to facilitate receipt of a user command and transfer of a corresponding command through the wired interface, the input button being operably connected to the collection of control circuitry.

10. The pillow speaker of claim 9, wherein the input button comprises a plurality of input buttons, the plurality of input buttons including a nurse call button and a light control button.

11. The pillow speaker of claim 1, wherein the wireless transmitter is also configured to receive signals to support programming functionality of the pillow speaker.

12. The pillow speaker of claim 1, further comprising a communications port configured to interface with a programming device, the communications port being operably connected to the collection of control circuitry and being able to upload a code set stored in memory of the programming device.

13. The pillow speaker of claim 1, further comprising a potentiometer for adjusting a transmission power level associated with the wireless transmitter.

14. A pillow speaker, comprising: a case; a speaker positioned within the case; a collection of control circuitry positioned within the case; an infrared transmitter operably connected to the collection of control circuitry, the infrared transmitter having a light emitting diode that is exposed through an opening in the case, and wherein the wireless transmitter is configured to transmit wireless control signals to an external electronic media device; a wired interface includes at least two elongated conductors connected to the collection of control circuitry, the wired interface being configured to receive an audio signal from the external electronic media device; a nurse call button operably connected to the collection of control circuitry, the collection of control circuitry being configured to transfer a signal through the wired interface to a nurse call system without utilizing the infrared transmitter, said signal being indicative of user input received through the nurse call button.

15. The pillow speaker of claim 14, wherein the collection of control circuitry is configured to transfer the signal across at least two elongated conductors, and wherein the infrared transmitter is configured to transmit an infrared signal to control the electronic media device.

16. The pillow speaker of claim 15, further comprising an adjustment mechanism for adjusting a transmission power characteristic associated with the infrared transmitter, wherein the adjustment mechanism comprising a potentiometer, and wherein the transmission power characteristic comprises a power level of the light emitting diode.

17. The pillow speaker of claim 16, further comprising a communications port configured to interface with a programming device, the communications port being operably connected to the collection of control circuitry, and wherein the pillow speaker includes a headphone jack.

18. A method of wirelessly controlling an electronic device with a pillow speaker, the method comprising: positioning a light emitting diode through a hole in an outer case of the pillow speaker; covering the pillow speaker hole with a panel; generating wireless signals with the light emitting diode; directing the wireless signals from the light emitting diode to a remotely located electronic media device; and receiving an audio signal from the remotely located electronic media device, wherein receiving comprises receiving over a wired interface to the pillow speaker.

19. The method of claim 18, wherein directing the wireless signals from the light emitting diode to the remotely located electronic media device comprises transmitting the wireless signals up to a distance of 20 feet.

20. The method of claim 19, wherein covering the pillow speaker hole with a panel comprises covering the pillow speaker hole with a panel that is curved shaped similar to a shape of a back of the outer case of the pillow speaker.

* * * * *

UNITED STATES PATENT AND TRADEMARK OFFICE
CERTIFICATE OF CORRECTION

| | | |
|---|---|---|
| PATENT NO. | : 7,884,703 B2 | Page 1 of 1 |
| APPLICATION NO. | : 11/358599 | |
| DATED | : February 8, 2011 | |
| INVENTOR(S) | : Mark Sowada et al. | |

It is certified that error appears in the above-identified patent and that said Letters Patent is hereby corrected as shown below:

Title Page

Item [73] Assignee, delete "MI" and insert --MN--.

Signed and Sealed this
Twentieth Day of December, 2011

David J. Kappos
*Director of the United States Patent and Trademark Office*